United States Patent [19]

Yanai et al.

[11] Patent Number: 4,693,213
[45] Date of Patent: Sep. 15, 1987

[54] WASTE HEAT RECOVERY BOILER

[75] Inventors: Eiji Yanai; Tetsuzo Kuribayashi, both of Hitachi, Japan

[73] Assignee: Hitachi, Ltd., Tokyo, Japan

[21] Appl. No.: 841,179

[22] PCT Filed: Aug. 23, 1985

[86] PCT No.: PCT/JP85/00466
§ 371 Date: Mar. 19, 1986
§ 102(e) Date: Mar. 19, 1986

[87] PCT Pub. No.: WO86/01579
PCT Pub. Date: Mar. 13, 1986

[30] Foreign Application Priority Data
Aug. 24, 1984 [JP] Japan .................. 59-175030

[51] Int. Cl.⁴ .................................. F22D 1/00
[52] U.S. Cl. .................. 122/7 R; 60/39.182; 60/39.5; 122/421; 122/470; 422/173; 423/239
[58] Field of Search ........... 122/7 R, 420, 421, 470, 122/379; 110/343, 344, 345; 60/39.182, 39.5; 422/173; 423/239, 239 A

[56] References Cited

U.S. PATENT DOCUMENTS

| | | | |
|---|---|---|---|
| 4,106,286 | 8/1978 | Sakai et al. | 60/39.182 |
| 4,160,009 | 7/1979 | Hamabe | 423/239 X |
| 4,160,805 | 7/1979 | Inaba et al. | 60/39.182 X |
| 4,297,319 | 10/1981 | Ishibashi et al. | 422/173 X |
| 4,302,431 | 11/1981 | Atsukawa et al. | 423/239 |
| 4,335,084 | 6/1982 | Brogan | 110/345 X |
| 4,353,206 | 10/1982 | Lee | 60/39.182 |
| 4,466,241 | 8/1984 | Inui et al. | 122/7 R X |
| 4,501,233 | 2/1985 | Kusaka | 122/7 R X |

Primary Examiner—Albert J. Makay
Assistant Examiner—Steven E. Warner
Attorney, Agent, or Firm—Antonelli, Terry & Wands

[57] ABSTRACT

A waste heat recovery boiler for a turbine including two denitrating devices disposed in the boiler to reduce the NOx concentration in an exhaust gas below a predetermined value even when a turbine load changes. The overall denitration efficiency distribution of the boiler with respect to the turbine load can be set arbitrarily by selecting suitable positions of the denitrating devices and the amounts of a catalyst, and any adverse effects resulting from the change of the turbine load can be avoided.

8 Claims, 9 Drawing Figures

WASTE HEAT RECOVERY BOILER

BACKGROUND OF THE INVENTION

This invention relates to a waste heat recovery boiler which uses an exhaust gas of a gas turbine as a heat source and generates a driving steam for other steam power prime movers, and more particularly to a waste heat recovery boiler capable of reducing the concentration of nitrogen oxides NOx in the exhaust gas.

In a conventional composite cycle plant equipped with a gas turbine, a denitrating device is disposed in a waste heat recovery boiler which generates steam with the exhaust gas of the gas turbine as its heat source and a steam turbine using the generated steam as its driving steam, with the denitrating device removing NOx from the exhaust gas.

Generally, the denitration ratio of the denitrating device increases with a higher reaction temperature within a predetermined temperature range. For example, in a dry catalytic reduction decomposition process which charges ammonia as a reducing agent into the exhaust gas and passes the gas through a reactor to which an iron oxide type catalyst is packed in order to reduce and decompose the nitrogen oxides into non-toxic nitrogen contents and a steam, the denitration ratio depends greatly upon the reaction temperature of the catalyst layer, that is, the combustion gas temperature which is passed through the catalyst layer of the denitrating device. The denitration ratio drops drastically when the reaction temperature drops from 300° C. to 200° C., and substantially the highest denitration efficiency is attained at temperatures ranging from 310° C. to 470° C.

The temperature of the exhaust gas from a gas turbine varies widely between operating at rated load and operating under partial load. For example, the temperature drops from about 530° C. when operating at rated load to about 330° C. when operating with a 25% load. Therefore, Japanese Patent Laid-Open No. 96604/1979 proposes dividing a high-pressure evaporator, which is disposed inside the waste heat recovery boiler so that the temperature of the exhaust gas is as rear as possible to the predetermined temperature range described above even when the load condition of the turbine changes, into a high-pressure evaporator and a low-pressure evaporator.

Even if such a method is employed, however, the exhaust gas temperature at the inlet of the denitrating device drops down to about 260° C. at 25% of rated load; hence, a reduction of the efficiency of the denitrating device is unavoidable. In order to hold the NOx concentration at the outlet of the denitrating device below a certain value, the effect of the catalyst of the denitrating device must be drastically increased, although such a need does not exist during operation at rated load. Furthermore, although the NOx concentration in the exhaust gas of the gas turbine changes with the load, the conventional apparatus described above can not adequately compensate for such a change.

It is an object of the present invention to provide a waste heat recovery boiler which can reduce NOx with a minimal quantity of catalyst, and can arbitrarily set the distribution of denitration efficiency in accordance with a load to maintain NOx at prescribed values even when the load of a gas turbine changes from a low load to the rated load.

In a waste heat recovery boiler which generates steam for driving a steam turbine by utilizing the exhaust gas of a gas turbine, the present invention is characterized in that at least two denitrating devices for removing NOx components in the exhaust gas are disposed in the waste heat recovery boiler so as to change the distribution of the denitration efficiency of the denitrating device with respect to the load, and can thus avoid any adverse effects resulting from the change of exhaust gas temperatures with the change of the NOx concentration distribution in the exhaust gas of the gas turbine and with the change of the exhaust gas temperature.

DETAILED DESCRIPTION

Figure 1:
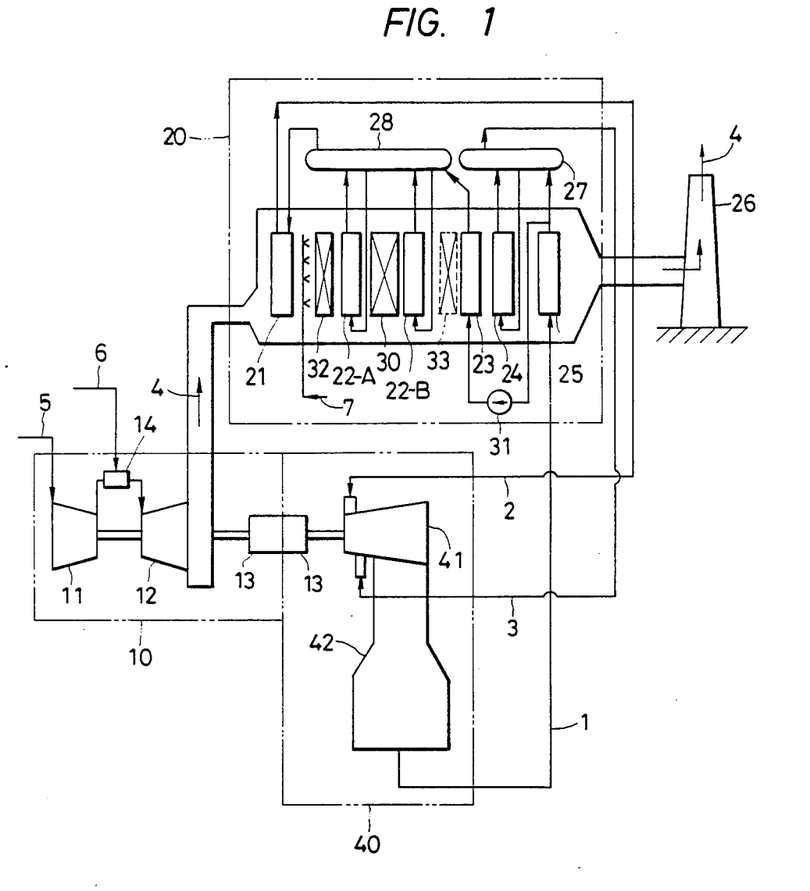
FIG. 1 is a schematic view of a composite cycle plant including a gas turbine and a waste heat reocvery boiler with a steam turbine, and denitrating devices by a dry catalytic decomposition process disposed in the waste heat recovery boiler, in accordance with one embodiment of the present invention.

Referring to FIG. 1, a composite cycle plant includes a gas turbine 10, a waste heat recovery boiler 20 which uses the exhaust gas discharged from the gas turbine 10 as a heat source and generates steam, a steam turbine 40 which uses the steam generated by the waste heat recovery boiler 20 as its driving steam, and denitrating devices 30 and 32 which eliminate nitrogen oxides (NOx) in the exhaust gas discharged from the gas turbine 10. The gas turbine 10 is equipped with an air compressor 11 which pressurizes inlet air 5, a burner 14 which burns the pressurized inlet air 5 together with a fuel supplied from a fuel system 6, a turbine 12 driven by the exhaust gas generated by combustion, and a generator 13 bearing a load. A superheater 21, a front high-pressure evaporator 22-A, a rear high-pressure evaporator 22-B, a high-pressure fuel economizer 23, a low-pressure evaporator 24, a low-pressure fuel economizer 25 and a chimney 26 are disposed in that order, from upstream to downstream of the exhaust gas flow introduced from the waste heat recovery boiler 20. A boiler transfer pipe 31 is disposed between the outlet of the low-pressure fuel economizer 25 and the high-pressure fuel economizer 23, and pressure-fed feed water.

The steam generated by the low-pressure evaporator 24 is introduced into the steam turbine 40 by steam pipe systems 2, 3 through the superheater 21 and the low-pressure steam drum 27, and a load is borne by the generator 13 which is common to a gas turbine generator. The feed water is introduced to the low-pressure fuel economizer 25 from the steam trubine 40 through the feed water pipe system 1. The denitrating devices 30 and 32 are disposed between the front high-pressure evaporator 22-A and the rear high-pressure evaporator 22-B of the waster heat recovery boiler 20 each of which communicate with a high pressure steam drum 28, and between the superheater 21 and the front high-pressure evaporator 22-A, respectively.

Next, the operation of the waste heat recovery boiler of the composite cycle plant equipped with the denitrating devices having the construction described above will now be explained.

In FIG. 1, the inlet air 5 of the gas turbine 10 is pressurized by the air compressor 11, and is turned into combustion gas of a high temperature as the fuel is burnt combusted by the burner 14. The combustion gas drives the turbine 12. Therefore, the exhaust gas is introduced into the waste heat recovery boiler 20. When the gas turbine 10 is operated at rated load, the exhaust gas flows at a temperature of about 530° C. into the superheater 21 due to the exhaust gas temperature characteristics in the waste heat recovery boiler 20 shown in FIG. 2, and then flows into the front denitrating device 32 as exhaust gas at about 470° C. An ammonia charging device 7 is disposed upstream of the front denitrating device 32 jets and mixes an ammonia gas into the combustion exhaust gas that flows down, and lets it flow and come into contact with a catalyst layer inside the front denitrating device 32, so that part of the nitrogen oxides in the exhaust gas is reduced and decomposed into non-toxic nitrogen and oxygen by the catalytic action of the catalyst.

Furthermore, the exhaust gas passes through the front high-pressure evaporator 22-A, and after its temperature drops to about 360° C., the exhaust gas flows into the rear denitrating device 30. The exhaust gas then flows through the rear high-pressure evaporator 22-B, the high-pressure fuel economizer 23, the low-pressure evaporator 24 and the low-pressure fuel economizer 25, and is thereafter discharged from the chimney 26.

Figure 2:
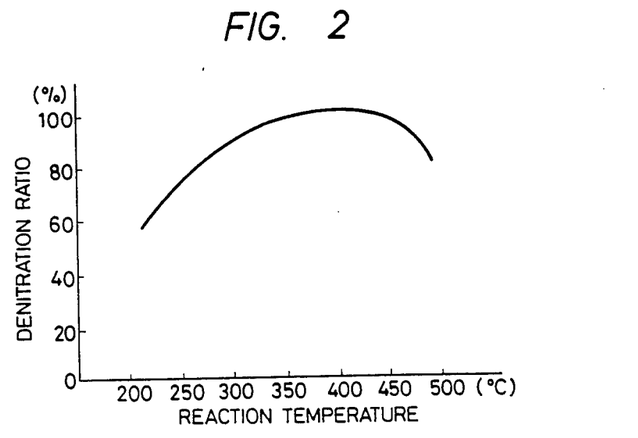
FIG. 2 is a graphical illustration of the characteristics of denitration ratio of the denitrating device with respect to a denitration reaction temperature.

The relationship between the reaction temperature and denitration ratio of the denitrating device is shown in FIG. 2, for example. The denitration ratio is high at a reaction temperature of from about 300°0 C. to about 450° C. In the above-mentioned case, the coefficient of denitration of the denitrating device 32 is somewhat reduced, but since the coefficient of denitration of the other denitrating device 30 is maintained at a high level, the overall coefficient of denitration can be held at a high level.

Figure 3:
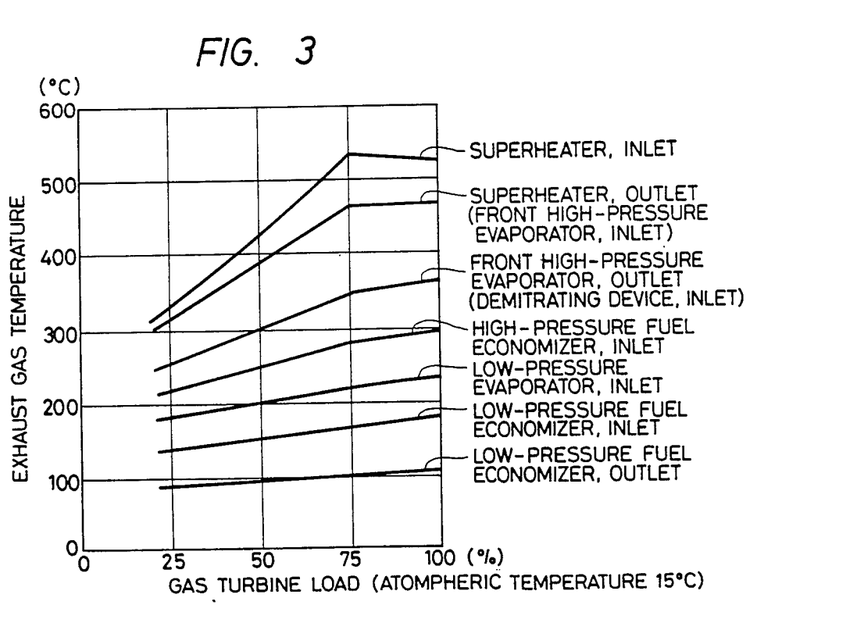
FIG. 3 is a graphical illustration of the characteristics of the exhaust gas temperature at each position inside the waste heat recovery boiler.

When, for example, the gas turbine 10 is operated at 25% of rated load, for example, the combustion exhaust gas temperature of the gas turbine drops to about 300° C. as shown in FIG. 3. In this case, the inlet exhaust gas temperature of the rear denitrating device 30 drops to about 260° C. in the same way as in the prior art methods, and the denitration efficiency also drops. However, since the inlet exhaust gas temperature of the front denitrating device 32 of the present invention is as high as about 310° C., its denitration efficiency can be held at a high level, and hence the overall denitration efficiency can be held at a sufficiently high level.

The condition in which the denitration efficiency distribution of the denitrating device can be changed arbitrarily with a turbine load in accordance with the embodiment of the invention will now be explained in connection with FIG. 4.

Figure 4:
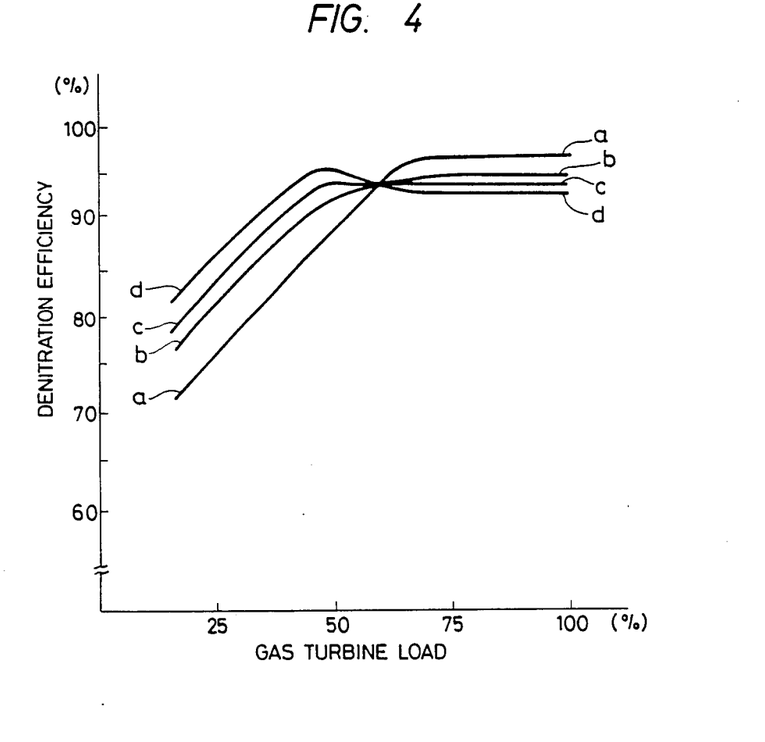
FIG. 4 is a graphical illustration of the characteristics of the denitration efficiency with respect to a gas turbine load when the distribution ratio of the amount of a catalyst is changed.

In FIG. 4, the curve a represents the characteristics in the prior art system in which one denitrating device is disposed between the evaporators, with the curves b, c and d representing the overall denitration efficiency characteristics in such cases where the two denitrating devices 30 and 32 are disposed as shown in FIG. 1 and the same amount of the catalyst as in the prior art system is distributed at the ratios of 1:2 (curve b), 1:1 (curve c) and 2:1 (curve d) to the denitrating devices 30 and 32.

It can be understood by comparing these characteristics that the characteristics of the prior art system (curve a) exhibit a high efficiency at or near rated load of the gas turbine, but drop off markedly under partial load, particularly below 50% of rated load.

The embodiment of the present invention can improve the denitration efficiency in the low load range, and this improvement increases with a higher catalyst distribution ratio. Since the denitration efficiency in the high load range drops, it is possible to change the denitration efficiency distribution from a curve exhibiting a uniform rise to a curve having a peak or peaks.

Figure 5:
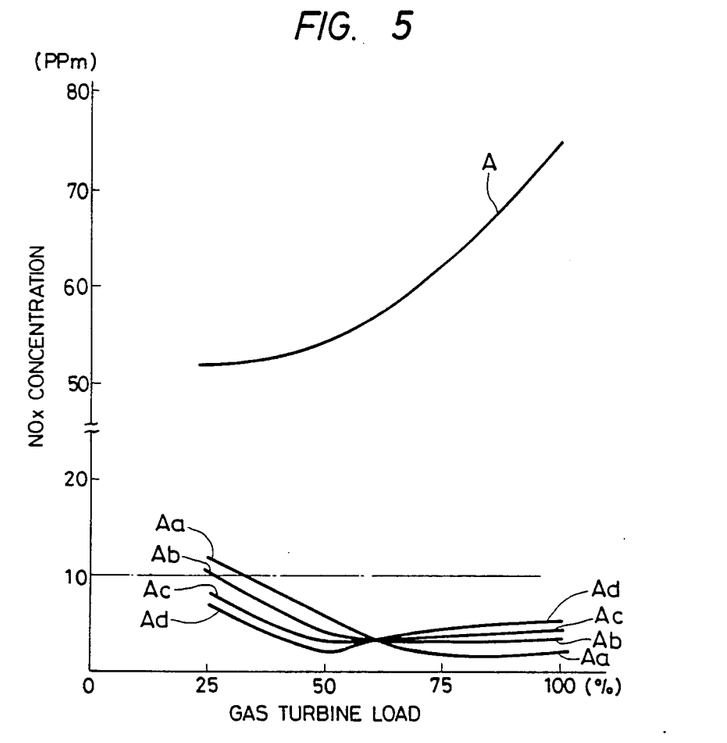
FIG. 5 is a graphical illustration of the NOx concentration at the outlet of the gas turbine and the NOx concentration at the outlet of a rear denitrating device with respect to a gas tubine load, and their restricted values.

In FIG. 5, the NOx concentration at the outlet of the gas turbine of the prior art system with respect to the gas turbine load is represented by a curve A, and the NOx concentration at the outlet of the denitrating device is represented by each curve Aa, Ab, Ac and Ad. Here, the NOx concentration characteristics curves at the outlet of the denitrating device are prepared by combining the curve A of FIG. 5 with the denitration efficiency characteristics curves a, b, c and d of FIG. 4, respectively.

The one-dot-chain line in the diagram represents an example of the restricted value at the outlet of the denitrating device at the gas turbine load of at least 25% of rated load.

The NOx characteristics (curve Aa) at the outlet of the denitrating device in the conventional configuration can not conform to the restriction of 10 ppm at the gas turbine load of below 30% of rated load. The NOx characteristics Ab, Ac and Ad in the embodiments of the present invention can fully satisfy the restricted value at a gas turbine load of 25% of rated load. In the case of the curve Ad (catalyst distribution ratio of 2:1), there is a sufficient margin to the restricted value in the full load range, and the amount of the denitrating catalyst can be reduced as much.

Also, the NOx concentration characteristics at the outlet of the denitrating device are made far more uniform in the full load range of the gas turbine than in the conventional system, and exhibit less fluctuation.

Figure 6:
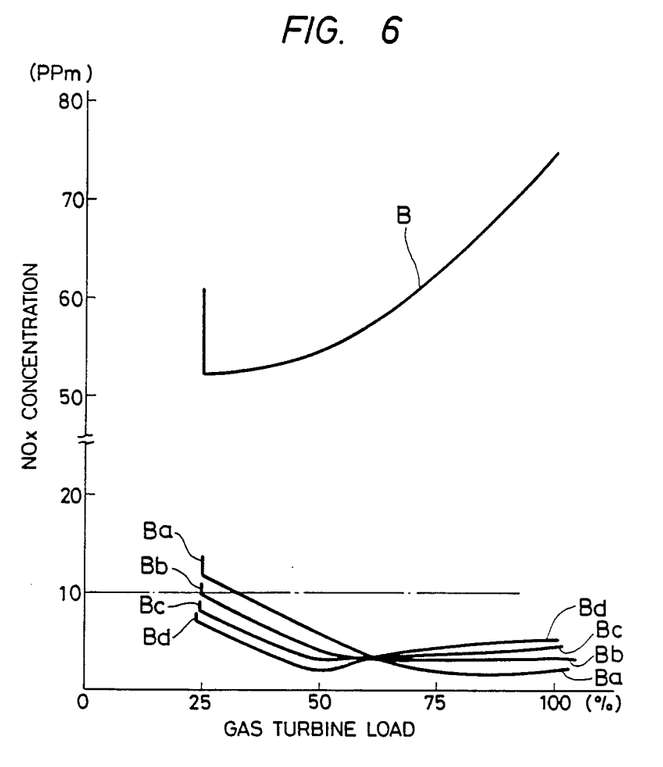
FIG. 6 is a graphical illustration of the characteristics of FIG. 5 when the NOx concentration distribution at the gas turbine outlet changes.

FIG. 6 is a characteristics graphical illustration similar to FIG. 5, but shows the case where the distribution of the NOx concentration at the outlet of the gas turbine changes. Here, curve B represents the NOx concentration at the outlet of the gas turbine, and curves Ba, Bb, Bc and Bd represent the NOx concentration characteristics on the outlet side of the denitrating device. As can be seen clearly from FIG. 6, the conventional system (curve Ba) and the curve Bb does not fall with the restriction, 10 ppm. In contrast, when the catalyst distribution ratio to the denitrating device 32 at higher temperatures is high (characteristic curves Bc, Bd), the restricted value can be sufficiently cleared. Since a sufficient margin exists from a low load to the rated load in the case of the curve Bd, the amount of the denitrating catalyst can be reduced.

Figure 7:
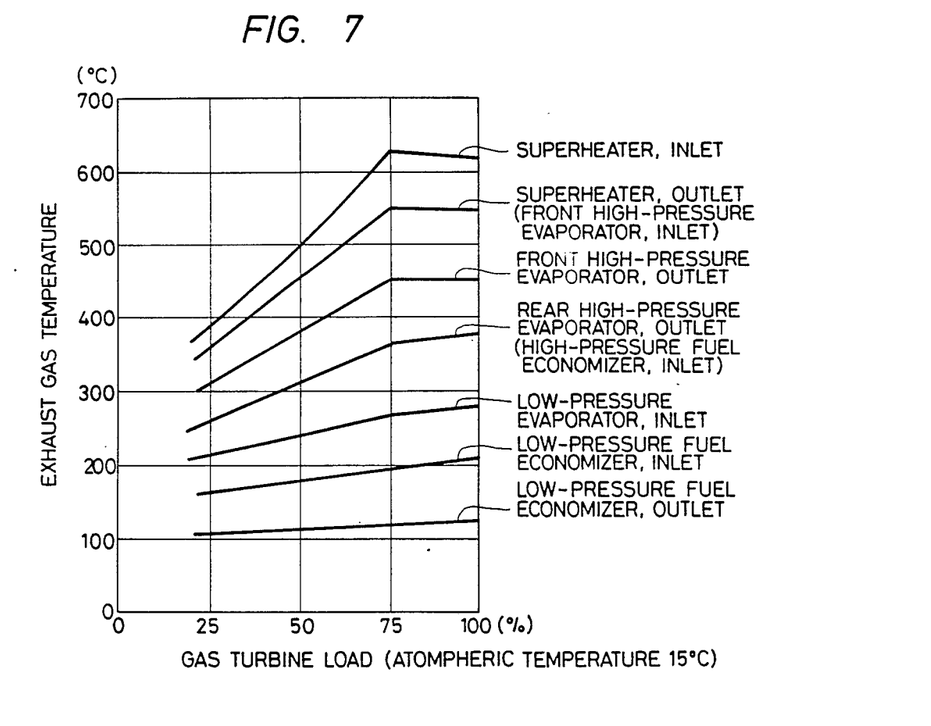
FIG. 7 is a graphical illustration of the characteristics of the exhaust gas at each position inside the waste heat recovery boiler when the gas turbine exhaust gas temperature is higher than in the prior art apparatus.

It is expected that the gas turbine combustion gas temperature will further rise with the progress in gas turbine apparatuses in general. In other words, the temperature characteristics at each portion inside the waste heat recovery boiler shown in FIG. 3 shift sequentially to higher temperature and attain the characteristics such as shown in FIG. 7. In this case, if the denitrating devices 32 and 30 are divided as shown in FIG. 1, the exhaust gas temperature will become so high at the time of the rated load operation of the gas turbine that the efficiency of the denitrating device 32 drops markedly and the overall denitrating efficiency drops, as well. This problem can be solved by disposing the denitrating device 33 between the rear high-pressure evaporator 22-B and the high-pressure fuel economizer 23 instead of disposing the denitrating device between the superheater 21 and the front high-pressure evaporator 22-A. In this case, two denitrating devices 30 and 33 are used.

Figure 8:
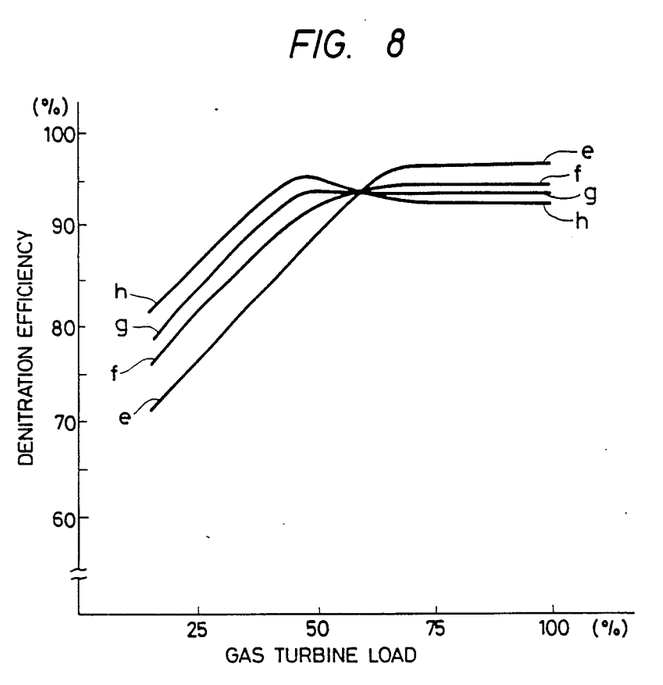
FIG. 8 is a graphical illustration of the characteristics of the denitration efficiency when the distribution ratio of the amount of the catalyst is changed with respect to the gas turbine load in another embodiment of the present invention.
Figure 9:
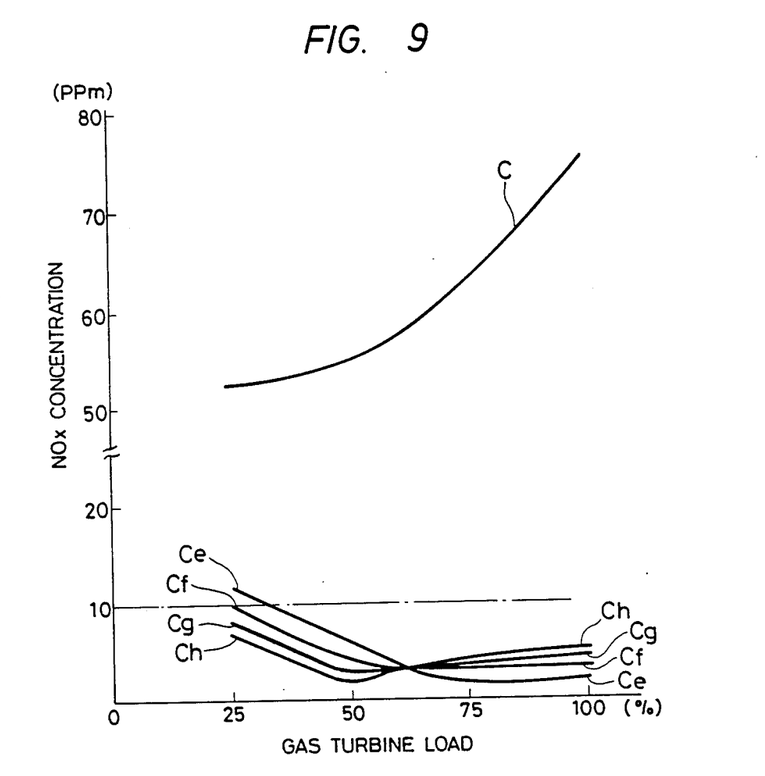
FIG. 9 is a graphical illustration of the NOx concentration at the gas turbine outlet and the NOx concentration at the outlet of the denitrating device with respect to the gas turbine load, and an example of the restricted values.

FIG. 8 graphically illustrates the denitration efficiency characteristics with respect to a gas turbine load. Curve e represents the characteristic curve of the conventional system, and curves f, g and h represent the denitration efficiency characteristics in the cases where the two denitrating devices 30 and 33 are disposed in FIG. 1 and the distribution ratio of the catalyst amount is 2:1 (curve f), 1:1 (curve g) and 1:2 (curve h), respectively. In FIG. 9, curve c represents the NOx concentration on the outlet side of the gas turbine with respect to the gas turbine load, and curves Ce (conventional system), Cf, Cg and Ch represent the NOx concentrations on the outlet side of the denitrating device by combining each characteristic curve of FIG. 8 with the curve c of FIG. 9. As can be seen clearly from FIG. 9, the conventional system can not satisfy the restriction (10 ppm) of the NOx concentration on the outlet side of the denitrating device, but the embodiments of the present invention (curves Cf, Cg, Ch) can meet the restriction.

Although the foregoing embodiment deals with the case where the two denitrating devices are disposed in the waste heat recovery boiler, three or more denitrating devices may also be disposed in the boiler. In this case, the denitration efficiency distribution can be set more arbitrarily. The denitrating device may be determined in the light of the exhaust gas temperature, and may be disposed in the gas turbine exhaust gas flow passage.

By virtue of the features of the present invention, the NOx concentration on the outlet side of the denitrating device can be made uniform regardless of the load fluctuation. Moreover, the denitrating device of the present invention can improve the denitration efficiency as compared with a conventional denitrating device using the same amount of denitrating catalyst. Additionally, the amount of denitrating catalyst capable of clearing the restricted value can be drastically reduced in accordance with the present invention.

Furthermore, since the denitration efficiency distribution with respect to the load can be changed, the present invention is capable of coping with the distribution change of the NOx concentration on the outlet side of the gas turbine with respect to the gas turbine load.

What is claimed is:

1. A waste heat recovery boiler of the type which utilizes an exhaust gas of a gas turbine and generates steam for driving a steam turbine, the improvement wherein at least two denitrating devices for removing NOx components in the exhaust gas therefrom are disposed inside said waste heat recovery boiler, said waste heat recovery boiler is equipped with fuel economizers for preheating feed water by said exhaust gas, rear and front evaporators for evaporting the pre-heated feed water, a superheater for for heating the vaporized feed water and generating the driving steam for said steam turbine, all of said constituent members being disposed sequentially from a downstream side to an upstream side of the exhaust gas, and wherein said denitrating devices are disposed between said at least two evaporators and between said front evaporator and said superheater.

2. A waste heat recovery boiler for generating a steam for driving a steam turbine by utilizng an exhaust gas of a gas turbine, the waste heat recovery boiler comprising fuel economizer means for preheating feed water by the exhaust gas, rear and front evaporator means for evaporating the pre-heated feed water, heating means including a superheater for generating the driving steam for the steam turbine and for heating vaporized feed water, said fuel economizer means, rear and front evaporator means and heating means being disposed sequentially from a downstream side to an upstream side of the exhaust gas, and denitrification means for removing NOx components from the exhaust gas, the denitrification means including at least two denitrating devices disposed inside said waste heat recovery boiler, and wherein said denitrating devices are disposed between said at least two evaporator means and between said rear evaporator means and said fuel economizer means.

3. The waste heat recovery boiler as defined in claim 2, wherein said evaporator means includes high-pressure evaporators, and a low-pressure evaporator is further disposed downstream of said fuel economizer means.

4. The waste heat recovery boiler as defined in claim 3, wherein positions of said two denitrating devices and a distribution ratio of amounts of a catalyst are determined in accordance with the NOx concentration distribution at an outlet of said gas turbine with respect to a turbine load.

5. The waste heat recovery boiler as defined in claim 3, wherein positions of said two denitrating devices and a distribution ratio of amounts of a catalyst are determined on a basis of an exhaust gas temperature at an outlet of said gas turbine, which temperature is determined in accordance with a turbine load.

6. A waste heat recovery boiler for generating a steam for driving a steam turbine by utilizing an exhaust gas of a gas turbine, the waste heat recovery boiler comprising fuel economizer means for preheating feed water by the exhaust gas, rear and front evaporator means for evaporting the pre-heat feed water, heating means including a super heater for generating the driving steam for the steam turbine and for heating vaporized feed water, said fuel economizer means, rear and front evaporator means and heating means being disposed sequentially from the downstream side to an upstream side of the exhaust gas, and denitrification means for removing NOx components from the exhaust gas, the denitrification means including at least two denitrating devices disposed inside said waste recovery boiler, and wherein said denitrating devices are disposed between said at least two evaporator means and between said front evaporator means and said superheater, said evaporator means includes high-pressure evaporators and a low-pressure evaporator is further disposed downstream of said fuel economizer means.

7. The waste heat recovery boiler as defined in claim 6, wherein positions of said two denitrating devices and a distribution ratio of amounts of a catalyst are determined in accordance with the NOx concentration distribution at an outlet of said gas turbine with respect to a turbine load.

8. The waste heat recovery boiler as defined in claim 6, wherein positions of said two denitrating devices and a distribution ratio of amounts of a catalyst are determined on a basis of an exhaust gas temperature at an outlet of said gas turbine, which temperature is determined in accordance with a turbine load.

* * * * *